(12) United States Patent
Liu et al.

(10) Patent No.: US 9,094,223 B2
(45) Date of Patent: *Jul. 28, 2015

(54) PREDICTIVE CACHING AND TUNNELING FOR TIME-SENSITIVE DATA DELIVERY TO ROAMING CLIENT DEVICES

(71) Applicant: Cisco Technology, Inc., San Jose, CA (US)

(72) Inventors: Hui Liu, San Jose, CA (US); Douglas Chan, San Jose, CA (US); Tak Ming Pang, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,345

(22) Filed: Oct. 27, 2014

(65) Prior Publication Data

US 2015/0043417 A1    Feb. 12, 2015

Related U.S. Application Data

(63) Continuation of application No. 13/626,983, filed on Sep. 26, 2012, now Pat. No. 8,897,261.

(51) Int. Cl.
*H04W 4/00* (2009.01)
*H04L 12/18* (2006.01)
(Continued)

(52) U.S. Cl.
CPC ............. *H04L 12/185* (2013.01); *H04W 12/06* (2013.01); *H04W 36/026* (2013.01);
(Continued)

(58) Field of Classification Search
CPC ... H04W 80/04; H04W 36/18; H04W 36/026; H04W 72/005; H04W 76/002; H04L 12/185
USPC .......... 370/331, 328, 329, 338; 455/436, 439, 455/442, 443
See application file for complete search history.

(56) References Cited

U.S. PATENT DOCUMENTS 7,464,358 B1    12/2008  Wadland et al.
7,873,020 B2 *  1/2011   Hunt et al. ..................... 370/338
(Continued)

FOREIGN PATENT DOCUMENTS

EP      1826949 A1    8/2007
EP      1968330 A1    9/2008
WO   2008044976 A1    4/2008

OTHER PUBLICATIONS

Amir et al., "An Inter-domain Routing Protocol for Multi-homed Wireless Mesh Networks", World of Wireless, Mobile and Multimedia Networks, International Symposium on A, IEEE,PI, Jun. 1, 2007, 10 pages.

(Continued)

*Primary Examiner* — Chuong T Ho
(74) *Attorney, Agent, or Firm* — Edell, Shapiro & Finnan, LLC

(57) ABSTRACT

Techniques are provided for delivering data to a wireless client device in a wireless network via a plurality of access points as the wireless client device roams from one access point to another. A wireless client device receives data via a first wireless access point in the wireless network. An impending roam of a wireless client device is detected. A set of one or more candidate wireless access points other than the first wireless access point is determined to which the wireless client device may potentially roam. The one or more wireless access points in the set are assigned to a multicast group, and the traffic is sent to the multicast group. A message containing a synchronized context enables a new wireless access point to send data to the wireless client device from a point where the first wireless access point stopped sending data to the wireless client device.

20 Claims, 6 Drawing Sheets

(51) Int. Cl.
*H04W 80/04* (2009.01)
*H04W 36/18* (2009.01)
*H04W 36/02* (2009.01)
*H04W 76/00* (2009.01)
*H04W 12/06* (2009.01)
*H04W 48/20* (2009.01)
*H04W 72/00* (2009.01)
*H04W 84/12* (2009.01)
*H04W 88/08* (2009.01)
*H04W 12/02* (2009.01)

(52) U.S. Cl.
CPC ........... *H04W 36/18* (2013.01); *H04W 76/002* (2013.01); *H04W 80/04* (2013.01); *H04W 12/02* (2013.01); *H04W 48/20* (2013.01); *H04W 72/005* (2013.01); *H04W 84/12* (2013.01); *H04W 88/08* (2013.01)

(56) References Cited

U.S. PATENT DOCUMENTS

| | | | |
|---|---|---|---|
| 8,082,533 | B1 | 12/2011 | Wadland et al. |
| 8,086,987 | B1 | 12/2011 | Wadland et al. |
| 8,111,674 | B2 | 2/2012 | Bheda et al. |
| 8,151,239 | B1 | 4/2012 | Wadland et al. |
| 8,254,357 | B2 | 8/2012 | Bheda et al. |
| 2006/0072532 | A1 | 4/2006 | Dorenbosch et al. |
| 2007/0081494 | A1 | 4/2007 | Petrescu et al. |
| 2009/0052382 | A1 | 2/2009 | Stephenson et al. |
| 2009/0086689 | A1* | 4/2009 | Hunt et al. .............. 370/338 |
| 2010/0103904 | A1* | 4/2010 | Jou et al. ................ 370/331 |
| 2011/0103284 | A1 | 5/2011 | Gundavelli et al. |
| 2012/0163343 | A1* | 6/2012 | Ahluwalia .............. 370/331 |

OTHER PUBLICATIONS

International Search Report and Written Opinion in International Application No. PCT/US2013/061297, mailed Mar. 20, 2014, 11 pages.

Emmelmann, Marc, "PAR & 5C Transition from FIA to Fast Initial Link Set-Up," IEEE 802.11-10/1106r1, Sep. 13, 2010, pp. 1-15.

\* cited by examiner

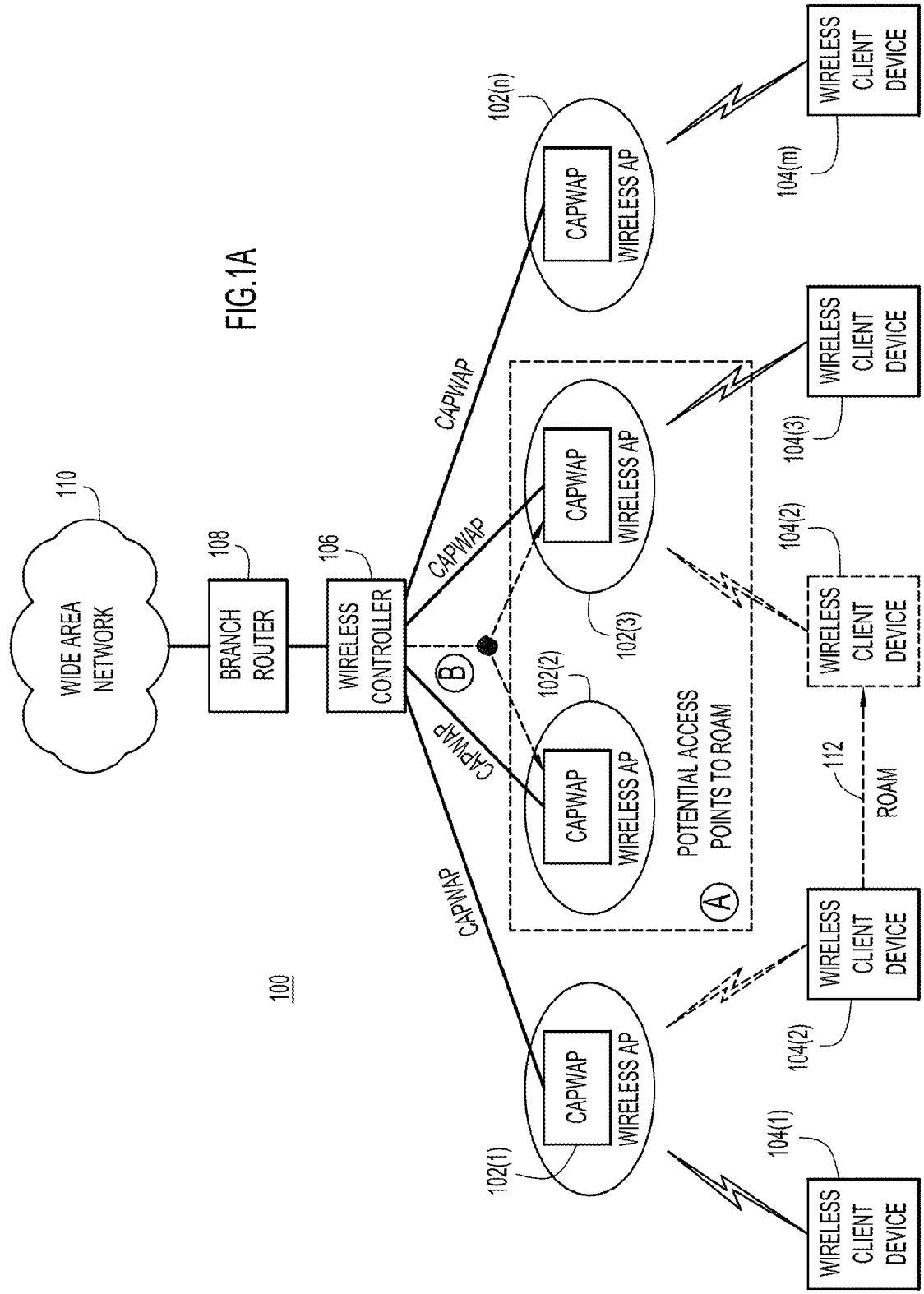

PREDICTIVE CACHING AND TUNNELING FOR TIME-SENSITIVE DATA DELIVERY TO ROAMING CLIENT DEVICES

CROSS REFERENCE TO RELATED APPLICATIONS

This application is a continuation of U.S. Non-Provisional patent application Ser. No. 13/626,983, entitled "Predictive Caching and Tunneling for Time-Sensitive Data Delivery to Roaming Client Devices" and filed on Sep. 26, 2012, the entirety of which is incorporated herein by reference.

TECHNICAL FIELD

The present disclosure relates to delivering data to wireless devices via access point devices in a network.

BACKGROUND

Wireless access point (APs) devices are deployed in network environments to serve wireless client devices. Each wireless AP is deployed to serve the wireless client devices in a coverage area. The APs can be configured to provide network access to the client devices via one or more standard communication protocols, such as IEEE 802.11, known commercially as WiFi™. As the wireless client devices move, they may associate with different wireless APs to send and receive data communications. Thus, the traffic that had been sent to the client by one AP needs to be sent to it by a different AP.

BRIEF DESCRIPTION OF THE DRAWINGS

FIGS. 1A and 1B show example embodiments of a system topology including one or more wireless client devices and a plurality of wireless access point devices, in which predictive tunneling of traffic is performed for roaming client devices according to techniques presented herein.

DESCRIPTION OF EXAMPLE EMBODIMENTS

Overview

Techniques are presented herein for delivering data to a wireless client device in a wireless local area network via a plurality of access point devices as the wireless client device roams from one access point device to another. A wireless client device receives data communications (i.e., traffic) via a first wireless access point device in the wireless local area network. An impending roam of a wireless client device is detected. A set of one or more candidate wireless access point devices other than the first wireless access point device is determined to which the wireless client device may potentially roam. The one or more wireless access point devices in the set are assigned to a multicast group, and the traffic is sent to the multicast group.

Example Embodiments

Figure 1B:
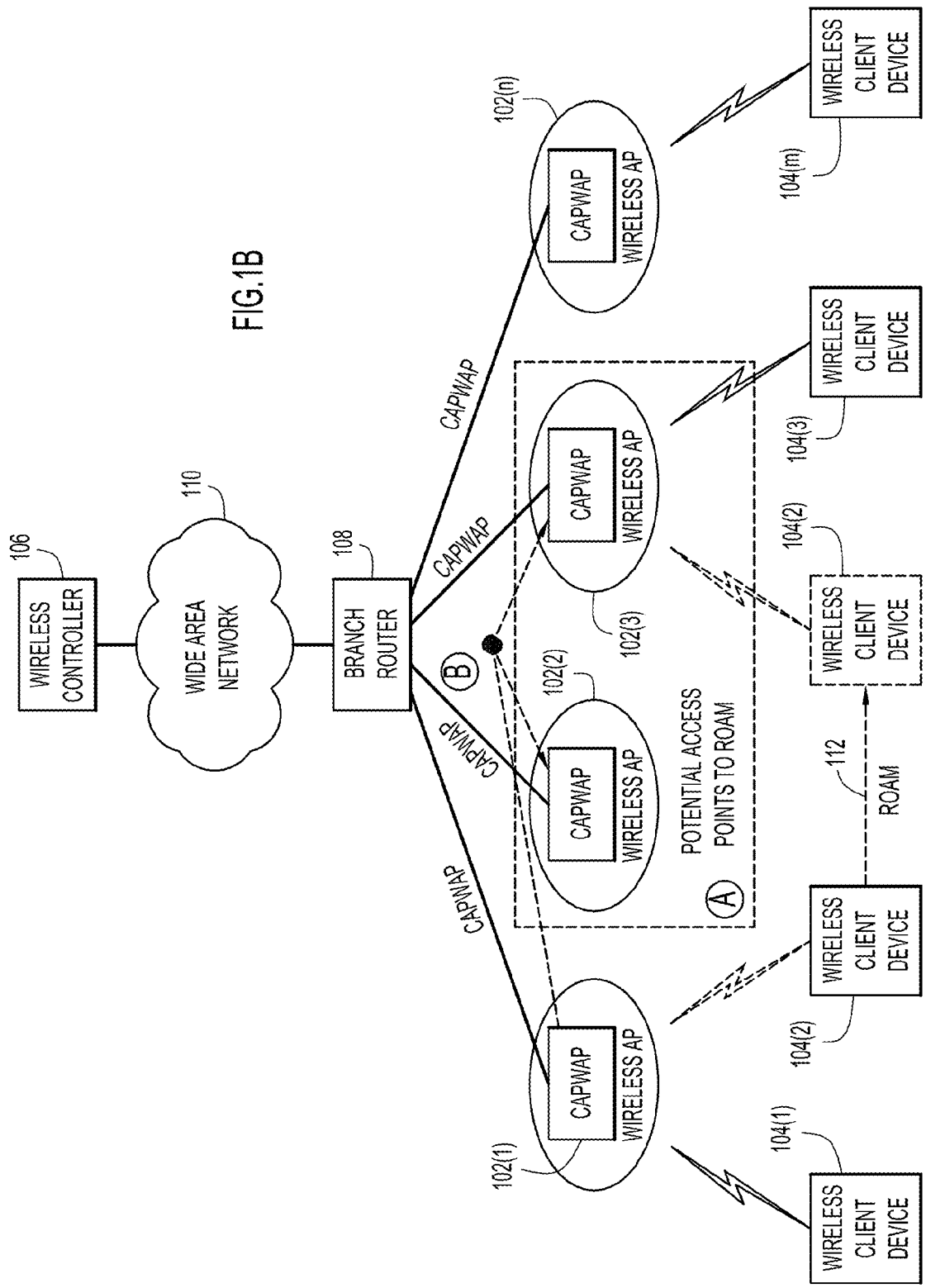

The techniques described herein relate to delivering data communications (also generically referred to herein as "traffic") to wireless devices in a network. An example network topology 100 is illustrated in FIGS. 1A and 1B. The topology 100 (hereinafter "network topology," "wireless network" or "network") comprises a plurality of wireless access point devices ("wireless access points" or "wireless APs"). The wireless access points are shown at reference numerals 102(1)-102(n). The network 100 also has one or more wireless client devices, shown at reference numerals 104(1)-104(m). In one embodiment, as shown in FIG. 1A, the wireless access points 102(1)-102(n) are configured to communicate with a wireless controller device 106 ("wireless controller") using, for example, a Control and Provisioning of Wireless Access Points (CAPWAP) protocol as specified by the Internet Engineering Task Force (IETF) Request for Comments (RFC) 5415. In the embodiment of FIG. 1A, the wireless controller 106 is configured to communicate with a branch router device 108, and the branch router device 108 is coupled to a wide area network (WAN) 110, e.g., the Internet. In the embodiment of FIG. 1B, the wireless access points 102(1)-102(n) communicate directly with the branch router device 108 (e.g., using the CAPWAP protocol) that, in turn, communicates with the wireless controller 106 across the WAN 110.

In one example, the wireless access point devices 102(1)-102(n) in FIGS. 1A and 1B are located in a geographic area (e.g., a corporate office building), while the wireless controller 106 and the branch router 108 may be located at a remote location (e.g., a central office located at a distance away from the corporate office building). For example, the wireless access point devices 102(1)-102(n) may be deployed as hybrid remote edge access point (H-REAP) devices such that the wireless access points 102(1)-102(n) are deployed locally without requiring a wireless controller 106 to be present in the local area of the wireless access points.

The network 100 is configured to provide traffic (e.g., audio, video and/or any type of data communications) to the wireless client devices 104(1)-104(m) via the wireless access points 102(1)-102(n). The content for the traffic may originate, for example, from a local server or from a server or device (e.g., web server) connected to the WAN 110. For simplicity, the source of the content is not shown in FIGS. 1A and 1B.

Each of the wireless access points 102(1)-102(n) is configured to wirelessly transmit the traffic to the wireless client devices 104(1)-104(m) over a coverage area. That is, each of the wireless access points 102(1)-102(n) may transmit the traffic to one or more of the wireless client devices 104(1)-104(m) when the wireless client devices are located within a corresponding coverage area or range of a corresponding one of the wireless access points. When a particular wireless access point transmits traffic to a particular wireless client device, the client device is said to be "associated" to or with that particular wireless access point. The wireless access points 102(1)-102(n) may be, for example, wireless access points that deliver data to the wireless client devices 104(1)-104(m) from a network using wireless local area network standards now known or hereinafter developed.

The wireless client devices 104(1)-104(m) may be mobile devices (e.g., mobile phones, computers, laptops, tablets, etc.) that are capable of readily moving (roaming) to change locations in the wireless network 100 relative to the wireless access points 102(1)-102(n). Thus, as a wireless client device roams or changes location within the network 100, the wireless client device may be associated with a different wireless access point based on its relative location to the wireless access points 102(1)-102(n). For example, as shown at reference numeral 112 in FIGS. 1A and 1B, wireless client device 104(2) may initially be associated to wireless access point 102(1) but may move and later become associated to wireless access point 102(3). Thus, before the wireless client device 104(2) roams, the wireless client device 104(2) sends and receives traffic via the wireless access point 102(1), and after the wireless client device 104(2) roams, it sends and receives traffic via the wireless access point 102(3).

As a wireless client device roams within the network 100, other equipment in the network (e.g., the wireless controller 106 and/or one or more of the wireless access points 102(1)-102(n)) ensures that data communications are seamlessly provided to the wireless client device as it associates with a different one of the wireless access point devices 102(1)-102(n). These techniques are described in detail hereinafter.

Briefly, according to the techniques presented herein, an impending roam event of a wireless client device is detected, and a set of one or more wireless access points to which the wireless client device is likely to roam is determined. The one or more wireless access points in this set are referred to as candidate access points and they are assigned to a multicast group. Prior to actually roaming by the wireless client device, the client traffic for the wireless client device (that is being wirelessly transmitted to the client device by the access point device to which the client device is currently associated with) is (copied and) sent to the multicast group (i.e., to a multicast group address for the multicast group) so that each of the access point devices in the set of candidate access point devices will receive and store the traffic. Thus, the access point devices in the candidate set will have traffic for the client before the client has even roamed to any one of those access point devices. As will be described hereinafter with reference back to FIGS. 1A and 1B, the wireless controller 106 may direct these operations according to one embodiment shown in FIG. 1A, or the access point to which the client is currently associated may direct these operations, as depicted in FIG. 1B.

Figure 2:
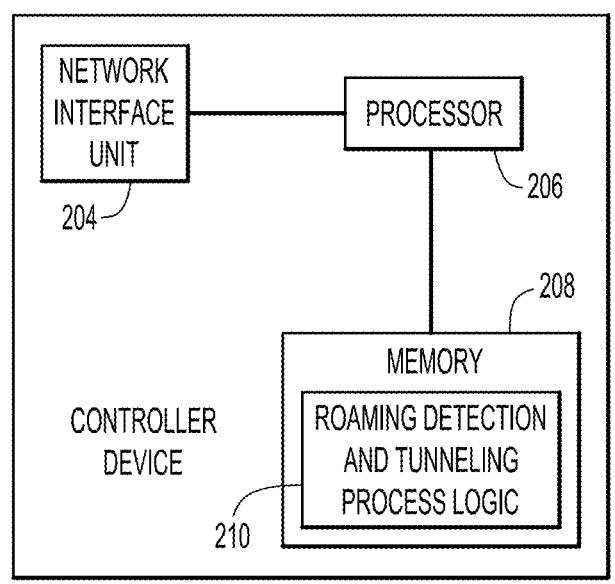
FIG. 2 shows an example block diagram of a wireless controller device configured to enable sending of a copy of the client traffic to one or more wireless access points to which a wireless client device may potentially roam.

Reference is now made to FIG. 2. FIG. 2 shows an example block diagram of the wireless controller 106 that is configured to direct the predictive tunneling operations according to the embodiment depicted in FIG. 1A. The wireless controller 106 comprises, among other components, a network interface unit 204, a processor 206 and a memory 208. The network interface unit 204 is configured to receive data communications from devices in the network 100 and to send data communications to devices in the network. For example, the network interface unit 204 is configured to send and receive data communications from the branch router 108, the wireless access points 102(1)-102(n) and the wireless client devices 104(1)-104(m). The network interface unit 204 is coupled to the processor 206. The processor 206 is, for example, a microprocessor or microcontroller that is configured to execute program logic instructions (i.e., software) for carrying out various operations and tasks of the controller device 106, as described herein. For example, the processor 206 is configured to execute roaming detection and tunneling process logic 210 to send data communications to a multicast group of access point devices to ensure a seamless delivery of data communications to the wireless client devices 104(1)-104(m). The functions of the processor 206 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. Thus, in general, the memory 208 may comprise one or more computer readable storage media (e.g., a memory storage device) encoded with software comprising computer executable instructions and when the software is executed (e.g., by the processor 206) it is operable to perform the operations described for the roaming detection and tunneling process logic 210.

The process logic 210 may take any of a variety of forms, so as to be encoded in one or more tangible computer readable memory media or storage devices for execution, such as fixed logic or programmable logic (e.g., software/computer instructions executed by a processor), and the processor 206 may be an application specific integrated circuit (ASIC) that comprises fixed digital logic, or a combination thereof.

For example, the processor 206 may be embodied by digital logic gates in a fixed or programmable digital logic integrated circuit, which digital logic gates are configured to perform the operations of the process logic 210. In general, the roaming detection and tunneling process logic 210 may be embodied in one or more computer readable storage media encoded with software comprising computer executable instructions and when the software is executed operable to perform the operations described hereinafter.

Figure 3:
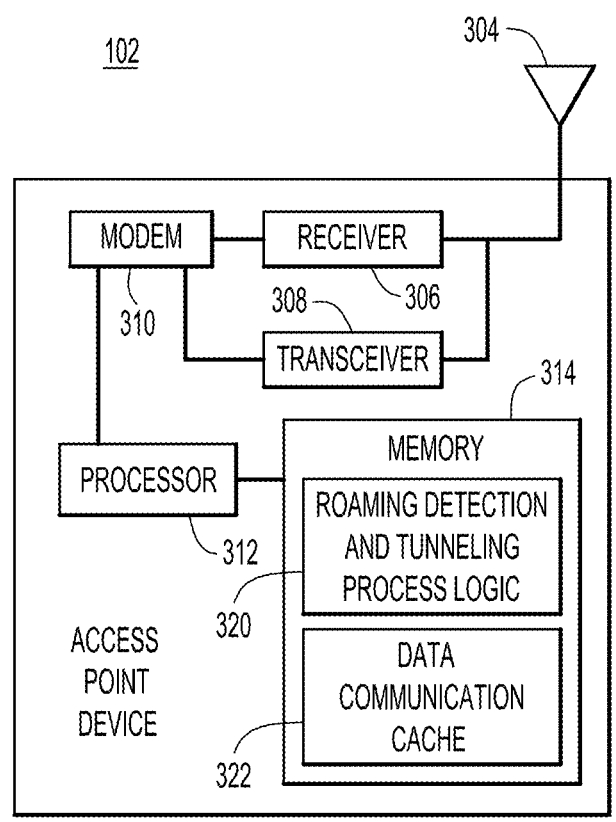
FIG. 3 shows an example block diagram of a wireless access point device configured to enable sending of client traffic to the one or more wireless access points to which the wireless client device may potentially roam.

Reference is now made to FIG. 3. FIG. 3 shows a block diagram 102 of one of the wireless access point devices 102(1)-102(n), that is configured to participate in, and optionally direct, the traffic tunneling operations according to the embodiment on FIG. 1B. It should be appreciated that the block diagram 102 in FIG. 3 may be any of the wireless access point devices 102(1)-102(n), and for simplicity, the wireless access point in FIG. 3 is referred to generally as "wireless access point 102." The wireless access point device 102 comprises, among other components, an antenna 304, a receiver 306, a transmitter 308, a modem 310, a processor 312 and a memory 314. The receiver 306 of the access point device 102 receives wireless communications from devices in the network 100 (e.g., the wireless client devices 104(1)-104(m)) via the antenna 304. Likewise, the transmitter 308 of the access point device 102 wirelessly transmits communications to client devices via the antenna 304. The receiver 306 and the transmitter 308 may be embodied in one or more integrated circuits, and are coupled to the modem 310. The modem 310 is configured to modulate signals to be transmitted by the transmitter 308 and to demodulated signals received by the receiver 306. The modem 310 may also be embodied in an integrated circuit, and is coupled to the processor 312. The processor 312 may be a microprocessor or microcontroller. In one example, the processor 312 is configured to execute roaming detection and tunneling process logic 320, stored in memory 314, to send data communications to a multicast group of access point devices to ensure a seamless delivery of data communications to a roaming wireless client device for the embodiment of FIG. 1B. Additionally, memory 314 has a data communication cache 322 that is allocated to store data communications (traffic) sent to it by the wireless controller 106 or by another access point as part of the predictive caching and tunneling procedure described herein. In other words, any access point device that is to be capable of participating in the predictive caching and tunneling techniques as an access point device that can receive traffic will have some portion of its memory allocated to cache traffic. However, any access point device that is to be capable of directing the predictive caching and tunneling techniques to one or more other access points will be configured with roaming detection and tunneling process logic 320

Referring back to FIGS. 1A and 1B, in general, traffic is delivered to the wireless client devices 104(1)-104(m) as they roam and associate with different wireless access points in the network 100. As described above, the wireless access points 102(1)-102(n) in the network 100 may be arranged in an H-REAP configuration, and thus, the wireless access points 102(1)-102(n) retrieve the data communications from the wireless controller 106 remotely across the WAN 110. Since the traffic is sent from the wireless controller 106 across the WAN 110, there may be delays in the wireless access points 102(1)-102(n) receiving traffic and sending the packets (of the traffic) to the appropriate one of the wireless client devices 104(1)-104(n). For certain data communications, these delays sometimes may be tolerable (e.g., web browsing, email, etc.), but some content may be more time-sensitive (e.g., isochronous data such as audio and/or video data), and thus, the delays in the data communications may present an undesirable experience for users at one or more of the wireless client devices 104(1)-104(m).

These delays may be exacerbated as the wireless client devices 104(1)-104(m) roam and associate with different wireless access points 102(1)-102(n) in the network 100. For example, the wireless client device 104(2) is associated to wireless access point 102(1) and is receiving video data from the wireless access point 102(1). When the client device 104(2) roams and associates to a new wireless access point (e.g., wireless access point 102(3)), the wireless client device 104(2) may have to establish authentication and association exchanges with the new wireless access point before it can begin receiving traffic from the access point 102(3). After associating with the new wireless access point, the wireless client device 104(2) then may have to re-negotiate a request for the video data via the new wireless access point. Often, as the wireless client device 104(2) is performing the authentication, association and requesting operations, the data buffer of the wireless client device 104(2) may be emptied before the video data transmission is resumed. Thus, the user of the wireless client device 104(2) experiences delays or disruptions in receiving the stream of data(e.g., video, audio, etc.).

The techniques described herein overcome these problems by distributing the client bound traffic to a set of one or more wireless access point devices to which it is determined that the client device is likely to roam. These techniques are described in connection with two embodiments. In the embodiment of FIG. 1A, the wireless controller 106 is configured to detect an impending roam of a wireless client device, and upon detecting the impending roam, the wireless controller 106 sends the client bound traffic for that client device to a set of one or more access points to which the wireless client device may potentially roam to be cached by the set of one or more access points. In the embodiment of FIG. 1B, one of the wireless access points (e.g., the access point to which the client device is currently associated) detects the impending roam and sends the traffic to the set of one or more access points to which the wireless client device may roam (to be cached by the set of one or more access points).

The first embodiment of FIG. 1A is now described. Referring to FIG. 1A, the wireless controller 106 detects an impending roam by information received from one or more of the wireless client devices 104(1)-104(m). For example, as the wireless client device 104(2) (initially associated to wireless access point 102(1)) moves in the network 100, the wireless controller 106 may obtain a received signal strength indication (RSSI) measurement made by access point 102(1) for signals sent between it and the wireless client device 104(2) and the wireless access point 102(1). If the RSSI level is below a threshold, the wireless controller 106 may determine that an impending roam is about to occur (e.g., indicating that the wireless client device 104(2) will soon be associating to a new wireless access point other than the wireless access point 102(1)).

Once this impending roam is detected, the wireless controller 106 determines a set of one or more candidate wireless access points (other than the wireless access point 102(1)) to which the wireless client device 104(2) may potentially roam. The wireless controller 106 may determine this set of candidate access points by, for example, determining a location of the wireless client device 104(2) relative to the location of the wireless access points 102(2)-102(n) based on signal measurement date obtained from multiple access points. A wireless access point may be included in the set of candidate access points if it is within a predetermined distance of the wireless client device 104(2). The wireless controller 106 may maintain a list of wireless access points that neighbor every other wireless access point. Thus, the wireless controller 106 can determine which of these neighboring wireless access points have recently received probe requests from the wireless client device 104(2). The probe requests may indicate that the wireless client device 104(2) may potentially roam to a particular wireless access point, and thus the wireless controller 106 may be able to determine the directional nature of roaming activity of the wireless client device 104(2).

In another example, the wireless controller 106 may evaluate a roaming history of the wireless client device 104(2) to predict future roaming tendencies of the wireless client device based on observed movement patterns of a particular client device over time. Additionally, the wireless controller 106 may determine the set of wireless access points by evaluating the RSSI between the wireless client device 104(2) and each of the wireless access points 102(2)-102(n), respectively. If the RSSI is above a predetermined threshold for an access point device, the corresponding wireless access point may be included in the set of candidate access point devices. Other metrics may be used to predict future roaming tendencies, for example, client location, packet error ratios of data transmissions and physical layer data changes. For example, in FIG. 1A, as the wireless client device 104(2) moves in the network, the wireless controller 106 includes wireless access point 102(2) and wireless access point 102(3) in the set of candidate wireless access points to which the wireless client device 104(2) may potentially roam (shown at reference A). Wireless access point 102(n), however, is not included in this set.

Once the wireless controller 106 determines the set of candidate wireless access points to which the wireless client device 104(2) may roam, the wireless controller 106 assigns the wireless access points in the set to a multicast group (with a corresponding multicast group address) and creates a dynamic multicast communication tunnel (e.g., a multicast CAPWAP tunnel). By establishing the multicast group, the wireless controller 106 is then able to prepare the wireless access points in the multicast group for the association and application flow transition for the roaming client device (the wireless client device 104(2)). That is, to reduce service interruption, a profile of the roaming client device is sent to the wireless access points in the multicast group by the wireless controller 106 in order to facilitate the set up of a communication link between the roaming client device and the wireless access points. The information in the profile of the roaming client device may include association information of the roaming client device (e.g., to reduce link setup time on the new wireless access point after the roaming client has camped on to a new wireless access point) and time-sensitive application flow context information of the roaming client device (e.g., to enable the new wireless access point to start accepting and buffering the data communications for existing active data flows to the roaming client). In one example, the association information may include client quality of service (QoS) profiles, client ongoing traffic QoS profiles and states, IP address assignment for the client and encryption key information for the client.

At this point, the wireless client device 104(2) is still associated to wireless access point 102(1) and is still receiving traffic via the wireless access point device 102(1). After the wireless controller 106 sends the profile information to the multicast group of wireless access points, the wireless controller 106 sends (a copy of) the client traffic (also currently being sent to the wireless client device 104(2)) to the multicast group address for the multicast group of wireless access points. The traffic is sent to the wireless access points in the multicast group via, for example, a multicast CAPWAP tunnel that is established between each wireless access point in the multicast group and the wireless controller 106 (if one is not already created). For example, the wireless controller 106 populates the multicast address of the multicast tunnel such that when wireless access points join the multicast group, they receive the traffic as multicast communications from the wireless controller 106. In other words, the wireless controller 106 utilizes the multicast group to tunnel unicast data communications in a dynamic multicast tunnel to the wireless access points in the multicast group. The multicast tunnel is shown at reference B.

Once the wireless access points in the multicast group receive the traffic, they store/cache the data for the traffic, e.g., in cache 322 referred to above in connection with FIG. 3. In one example, each wireless access point in the multicast group may store a predetermined amount of the traffic (e.g., a predetermined amount or number of minutes of video and/or audio data). If any of the wireless access points in the multicast group receives more than the predetermined amount of traffic than it can store it may discard the older portions of the cached traffic. Thus, for example, if the wireless access points in the multicast group are configured to store five seconds of video data in the data communications cache 322, and if the wireless access points receive seven seconds of video data (before the wireless client device 104(2) roams), each of the wireless access points will discard the oldest two seconds of the video data from the data communications cache 322.

As stated above, until this point, the wireless client device 104(2) has associated to a new wireless access point. That is, the actions described above occur when there is an impending roam. After the wireless client device 104(2) associates with a new wireless access point (e.g., the wireless access point 102(3)), the new wireless access point can begin sending the cached traffic to the wireless client device 104(2). For example, the new wireless access point may be able to send its cached traffic at the most recent point at which data communications from the previous wireless access point (wireless access point 102(1)) left off. In one example, the wireless controller 106 sends a message containing, for example, a real time transport protocol (RTP) sequence number, a CAPWAP packet sequence number, a layer 4 (and above) sequence number, etc. that provides a synchronized context to enable a seamless transition of data communications to the wireless client device 104(2). This message may be sent using a CAPWAP protocol.

Additionally, after the wireless client device 104(2) roams to the new wireless access point, the wireless controller 106 terminates sending of the traffic to the multicast group. Instead, traffic is sent unicast only to the new wireless access point. If the wireless controller 106 detects a further impending roam, it repeats the operations described above to generate a new set of candidate wireless access points to which the wireless client device 104(2) may roam.

A similar predictive tunneling scheme can be achieved when the wireless controller 106 is not in the best position to direct it, as explained in the second embodiment, which is now described in reference to FIG. 1B. In this embodiment, the predictive tunneling is performed by an access point to which the client device is currently (last) associated. In other words, in the second embodiment, the operations that are performed by the wireless controller 106 in the first embodiment may be performed by this access point. For example, the wireless access point 102(1) detects the impending roam of the wireless client device 104(2) (e.g., by measuring and evaluating the RSSI between it and the wireless client device 104(2)). After detecting the impending roam of client device 104(2), the wireless access point 102(1) determines a set of one or more candidate wireless access points other than the wireless access point 102(1) to which the wireless client 104(2) may potentially roam, using any of the techniques described above in connection with the wireless controller 106 directed embodiment depicted in FIG. 1B. The wireless access point 102(1) then assigns the wireless access points in the set to a multicast group and sends the profile of the wireless client device 104(2) to these wireless access points. The access point 102(1) sends traffic to the multicast group in a CAPWAP tunnel (in a manner similar to that described above for the wireless controller) to enable the wireless access points in the multicast group to cache a predetermined amount of the traffic data. After the wireless client device 104(2) roams to a new wireless access point (e.g., wireless access point 102(3)), the new access point can transmit its cached data to the client device 104(2). Additionally, the wireless access point 102(1) terminates sending of traffic to the multicast group. After the roam is completed, the wireless controller will thereafter take over unicasting traffic to the new wireless access point.

Figure 4:
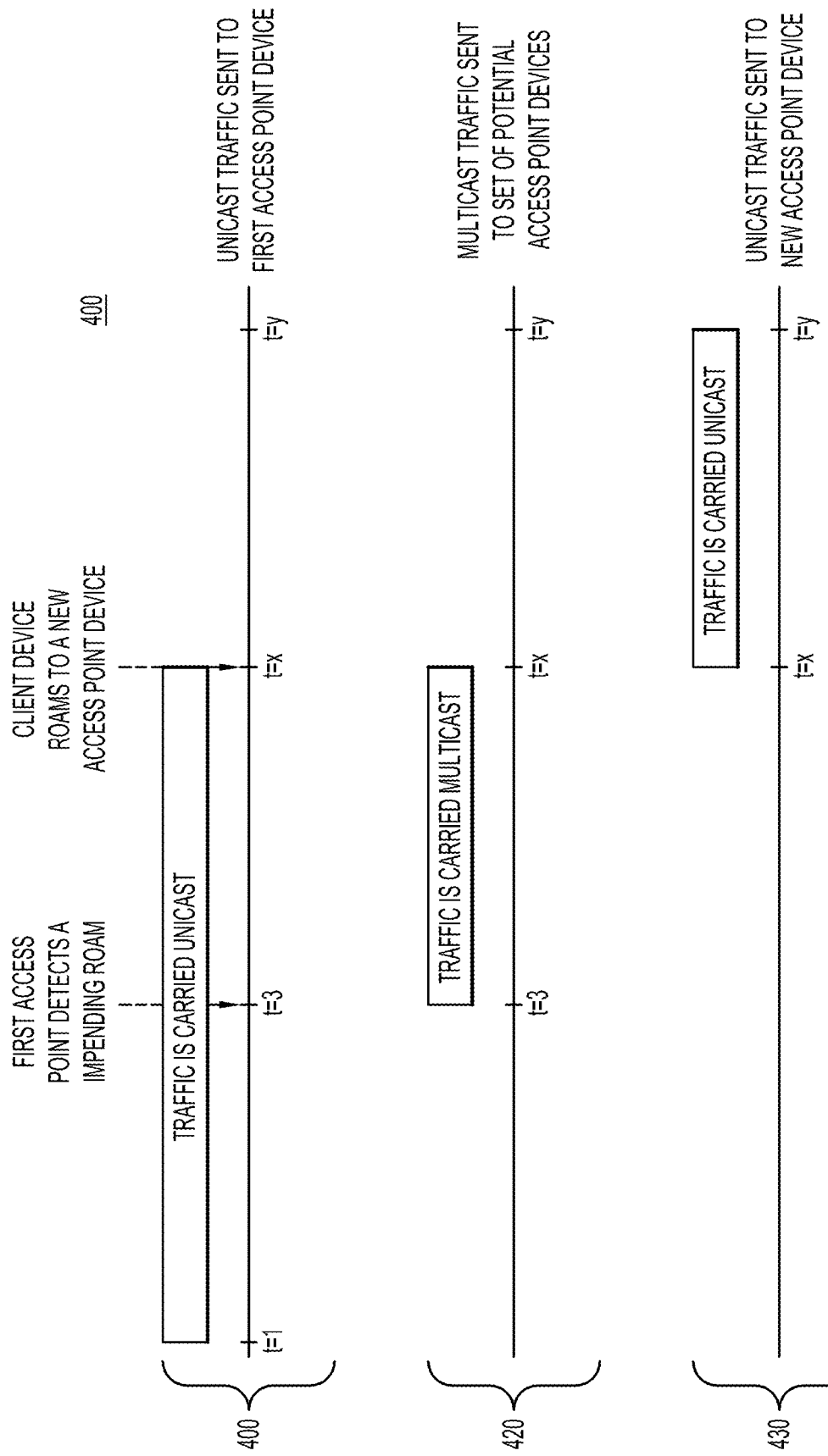
FIG. 4 shows an example timing of the predictive traffic tunneling and caching techniques.

Reference is now made to FIG. 4. FIG. 4 shows an example depiction of a timing 400 of traffic delivered to various wireless access points 102(1)-102(n) (and ultimately to the wireless client device 104(2)) in the network 100 in a roaming scenario. The embodiments of FIGS. 1A and 1B are contemplated by the timing 400. It should be appreciated that the time instances shown in FIG. 4 are merely examples.

The first time line, shown at reference numeral 410, depicts data transmissions to the wireless access point (e.g., the wireless access point 102(1)) to which the wireless client device 104(2) is currently associated. As shown, at time t=1, the wireless controller sends traffic unicast to the wireless access point 102(1) for wireless transmission to the wireless client device 104(2). At time t=3, an impending roam of the wireless client device 104(2) is detected. Thus, as shown in reference numeral 420, traffic for the client is multicasted to the wireless access points that are in a set of potential wireless access points to which the wireless client device 104(2) may roam. Some time later, as shown at 430, at time t=x, the wireless client device 104(2) roams to a new wireless access point, and the traffic is sent unicast to the wireless access point to which the wireless client device associates for ultimate delivery to the wireless client device. At time t=y, the wireless client device 104(2) terminates the data communication session.

Figure 5:
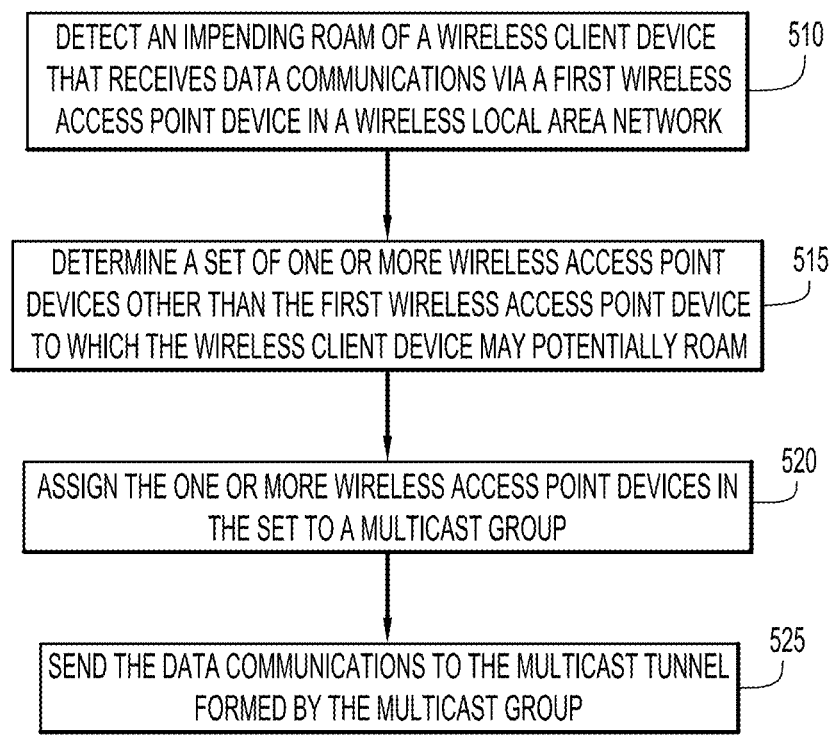
FIG. 5 shows an example flow chart depicting operations associated with the predictive tunneling and caching techniques.

Reference is now made to FIG. 5. FIG. 5 shows an example flow chart 500 depicting operations of the roaming detection and tunneling techniques to enable seamless transfer of data communications from one wireless access point to another wireless access point. These operations may be performed by the wireless controller 106 and/or by one or more of the wireless access points 102(1)-102(n) in the network 100, as described above. At operation 510, an impending roam is detected of a wireless client device that receives traffic via a first wireless access point device in a wireless local area network. At operation 515, a set of one or more candidate wireless access point devices, other than the first wireless access point device, to which the wireless client device may potentially roam is determined. These one or more wireless access point devices in the set are assigned, at operation 520, to a multicast group, and at operation 525, the traffic is sent to the multicast tunnel formed by the multicast group such that each of the wireless access point devices in the set stores the traffic. Thereafter, when the client device has roamed to one of the access points in the set, that access point wirelessly transmits the cached traffic to enable a seamless delivery of the traffic to the client device. The other access points in the set can discard the traffic that they have cached after a predetermined period of time indicating that the client device did not roam to them.

It should be appreciated that the techniques described above in connection with all embodiments may be performed by one or more computer readable storage media that is encoded with software comprising computer executable instructions to perform the methods and steps described herein. For example, the operations performed by the wireless controller 106 and/or one or more of the wireless access points 102(1)-102(n) may be performed by one or more computer or machine readable storage media (non-transitory) or device executed by a processor and comprising software, hardware or a combination of software and hardware to perform the techniques described herein.

In summary, a method is provided comprising: detecting an impending roam of a wireless client device that receives data communications via a first wireless access point device in a wireless local area network; determining a set of one or more of wireless access point devices other than the first wireless access point device to which the wireless client device may potentially roam; assigning the one or more wireless access point devices in the set to a multicast group; and sending the data communications to the multicast group.

In addition, one or more computer readable storage media encoded with software is provided comprising computer executable instructions and when the software is executed operable to: detect an impending roam of a wireless client device that receives data communications via a first wireless access point device in a wireless local area network; determine a set of one or more wireless access point devices other than the first wireless access point device to which the wireless client device may potentially roam; assign the one or more wireless access point devices in the set to a multicast group; and send the data communications to the multicast group.

Furthermore, an apparatus is provided comprising: a network interface unit configured to enable communications over a network; a memory; and a processor coupled to the network interface unit and the memory unit and configured to: detect an impending roam of a wireless client device that receives data communications via a first wireless access point device in a wireless local area network; determine a set of one or more wireless access point devices other than the first wireless access point device to which the wireless client device may potentially roam; assign the one or more wireless access point devices in the set to a multicast group; and send the data communications to the multicast group.

The above description is intended by way of example only. Various modifications and structural changes may be made therein without departing from the scope of the concepts described herein and within the scope and range of equivalents of the claims.

What is claimed is:

1. A method comprising:
   detecting an impending roam of a wireless client device that receives data communications via a first wireless access point device in a wireless local area network;
   determining a set of one or more of wireless access point devices other than the first wireless access point device to which the wireless client device may potentially roam;
   assigning the one or more wireless access point devices in the set to a multicast group;
   sending the data communications to the multicast group;
   sending client profile information to each of the wireless access point devices in the set to facilitate set up of communication between the wireless client device and a new wireless access point device; and
   sending to the new wireless access point device a message containing a synchronized context to enable the new wireless access point device to send stored data to the wireless client device from a point where the first wireless access point device stopped sending data to the wireless client device.

2. The method of claim 1, further comprising creating a dynamic multicast tunnel for the set of wireless access point devices if there is not a tunnel already created, and populating a multicast address of the tunnel together with the flow context information so that the set of wireless access point devices will join the multicast group and receive the data communications.

3. The method of claim 1, wherein sending the message containing the synchronized context comprises sending one of: a real time transport protocol (RTP) sequence number, a control and provisioning of wireless access points (CAPWAP) sequence number or a Layer 4 protocol sequence number.

4. The method of claim 1, after the client device completes its roaming to the new wireless access point device, further comprising terminating sending of data communications for the client device to the multicast group, and sending unicast data communications for the client device to the new wireless access point device.

5. The method of claim 1, wherein the data communications comprise a video stream or an audio stream.

6. The method of claim 1, wherein detecting, determining, assigning and sending are performed at a wireless network controller that is in communication with the one or more wireless access point devices in the wireless network.

7. The method of claim 1, wherein detecting the impending roam comprises:
   receiving information of a received signal strength indication (RSSI) signal between the wireless client device and the first wireless access point device; and
   determining the impending roam when the RSSI signal decreases below a threshold signal strength.

8. The method of claim 1, wherein detecting, determining, assigning and sending are performed at the first wireless access point device.

9. A non-transitory computer-readable storage media encoded with software comprising computer executable instructions and when the software is executed operable to:
  detect an impending roam of a wireless client device that receives data communications via a first wireless access point device in a wireless local area network;
  determine a set of one or more wireless access point devices other than the first wireless access point device to which the wireless client device may potentially roam;
  assign the one or more wireless access point devices in the set to a multicast group;
  send the data communications to the multicast group;
  send client profile information to each of the wireless access point devices in the set to facilitate set up of communication between the wireless client device and a new wireless access point device; and
  send to the new wireless access point device a message containing a synchronized context to enable the new wireless access point device to send stored data to the wireless client device from a point where the first wireless access point device stopped sending data to the wireless client device.

10. The non-transitory computer-readable storage media of claim 9, further comprising instructions operable to create a dynamic multicast tunnel for the set of wireless access point devices if there is not a tunnel already created, and populate a multicast address of the tunnel together with the flow context information so that the set of wireless access point devices will join the multicast group and receive the data communications.

11. The non-transitory computer-readable storage media of claim 9, wherein the instructions operable to send the message containing the synchronized context comprises instructions operable to send one of: a real time transport protocol (RTP) sequence number, a control and provisioning of wireless access points (CAPWAP) sequence number or a Layer 4 protocol sequence number.

12. The non-transitory computer readable storage media of claim 9, further comprising instructions operable to:
  terminate sending of data communications for the client device to the multicast group after the client device completes its roaming to the new wireless access point device; and
  send unicast data communications for the client device to the new wireless access point device.

13. The non-transitory computer-readable storage media of claim 9, wherein the instructions operable to detect the impending roam comprise instructions operable to:
  receive information of a received signal strength indication (RSSI) signal between the wireless client device and the first wireless access point device; and
  determine the impending roam when the RSSI signal decreases below a threshold signal strength.

14. The non-transitory computer-readable storage media of claim 9, wherein the instructions operable to detect, determine, assign and send are stored at a wireless network controller that is in communication with the one or more wireless access point devices in the wireless network.

15. The non-transitory computer-readable storage media of claim 9, wherein the instructions operable to detect, determine, assign and send are stored at the first wireless access point device.

16. An apparatus comprising:
  a network interface unit to enable communications over a network;
  a memory; and
  a processor coupled to the network interface unit and the memory to:
    detect an impending roam of a wireless client device that receives data communications via a first wireless access point device in a wireless local area network;
    determine a set of one or more wireless access point devices other than the first wireless access point device to which the wireless client device may potentially roam;
    assign the one or more wireless access point devices in the set to a multicast group; and
    send the data communications to the multicast group;
    send client profile information to each of the wireless access point devices in the set to facilitate set up of communication between the wireless client device and a new wireless access point device; and
    send to the new wireless access point device a message containing a synchronized context to enable the new wireless access point device to send stored data to the wireless client device from a point where the first wireless access point device stopped sending data to the wireless client device.

17. The apparatus of claim 16, wherein the processor further creates a dynamic multicast tunnel for the set of wireless access point devices if there is not a tunnel already created, and populates a multicast address of the tunnel together with the flow context information such that the set of wireless access point devices will join the multicast group and receive the data communications.

18. The apparatus of claim 16, wherein processor sends the message containing the synchronized context by sending one of: a real time transport protocol (RTP) sequence number, a control and provisioning of wireless access points (CAPWAP) sequence number and a Layer 4 protocol sequence number.

19. The apparatus of claim 16, wherein after the client device completes its roaming to the new wireless access point device, the processor terminates sending of data communications for the client device to the multicast group, and sends unicast data communications for the client device to the new wireless access point device.

20. The apparatus of claim 16, wherein the processor detects the impending roam by:
  receiving information of a received signal strength indication (RSSI) signal between the wireless client device and the first wireless access point device; and
  determining the impending roam when the RSSI signal decreases below a threshold signal strength.

* * * * *